(No Model.) 3 Sheets—Sheet 1.
R. GREGG.
HAY CARRIER.
No. 595,385. Patented Dec. 14, 1897.
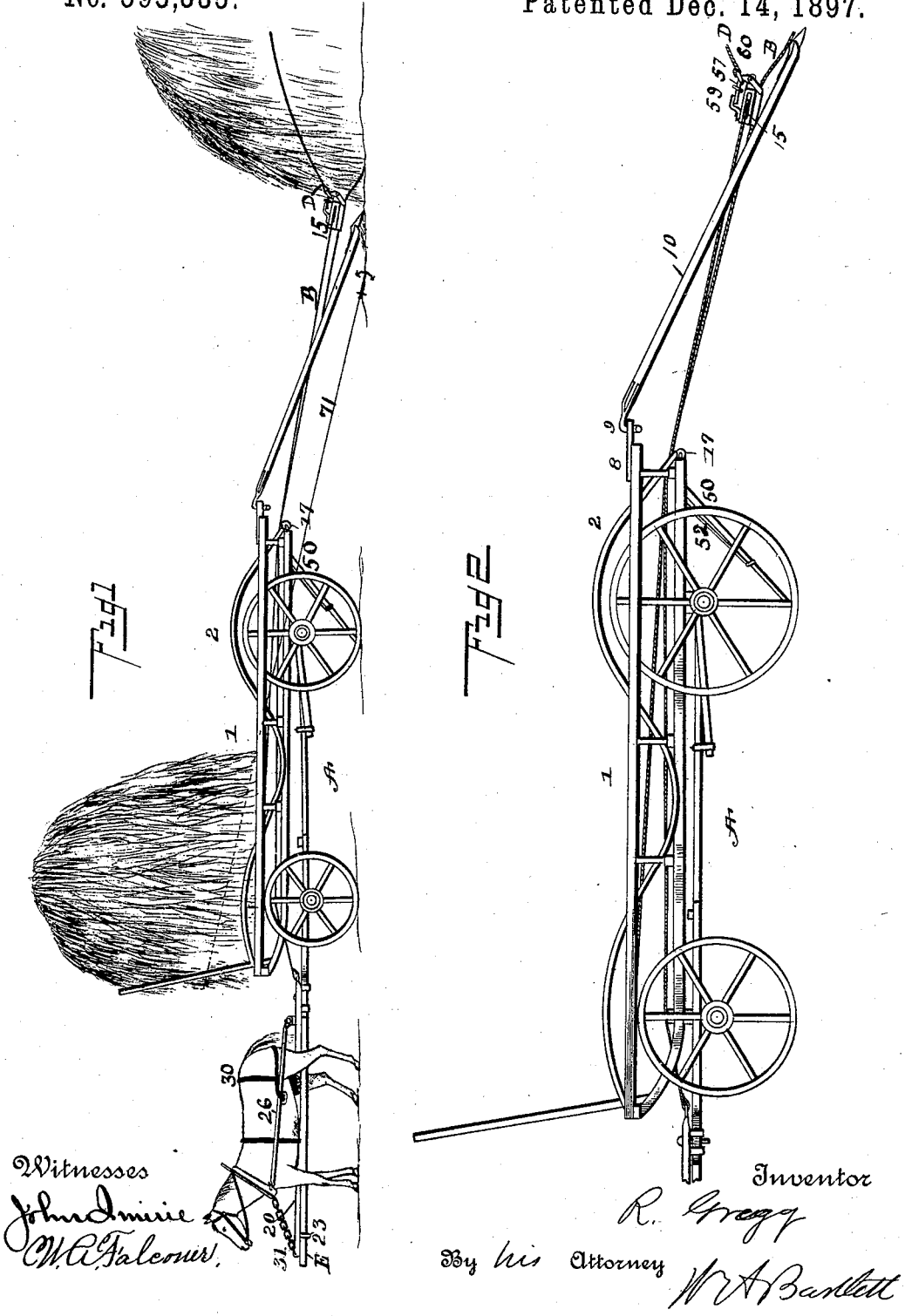
Witnesses
John Imire
C. W. A. Falconer
Inventor
R. Gregg
By his Attorney
W. H. Bartlett

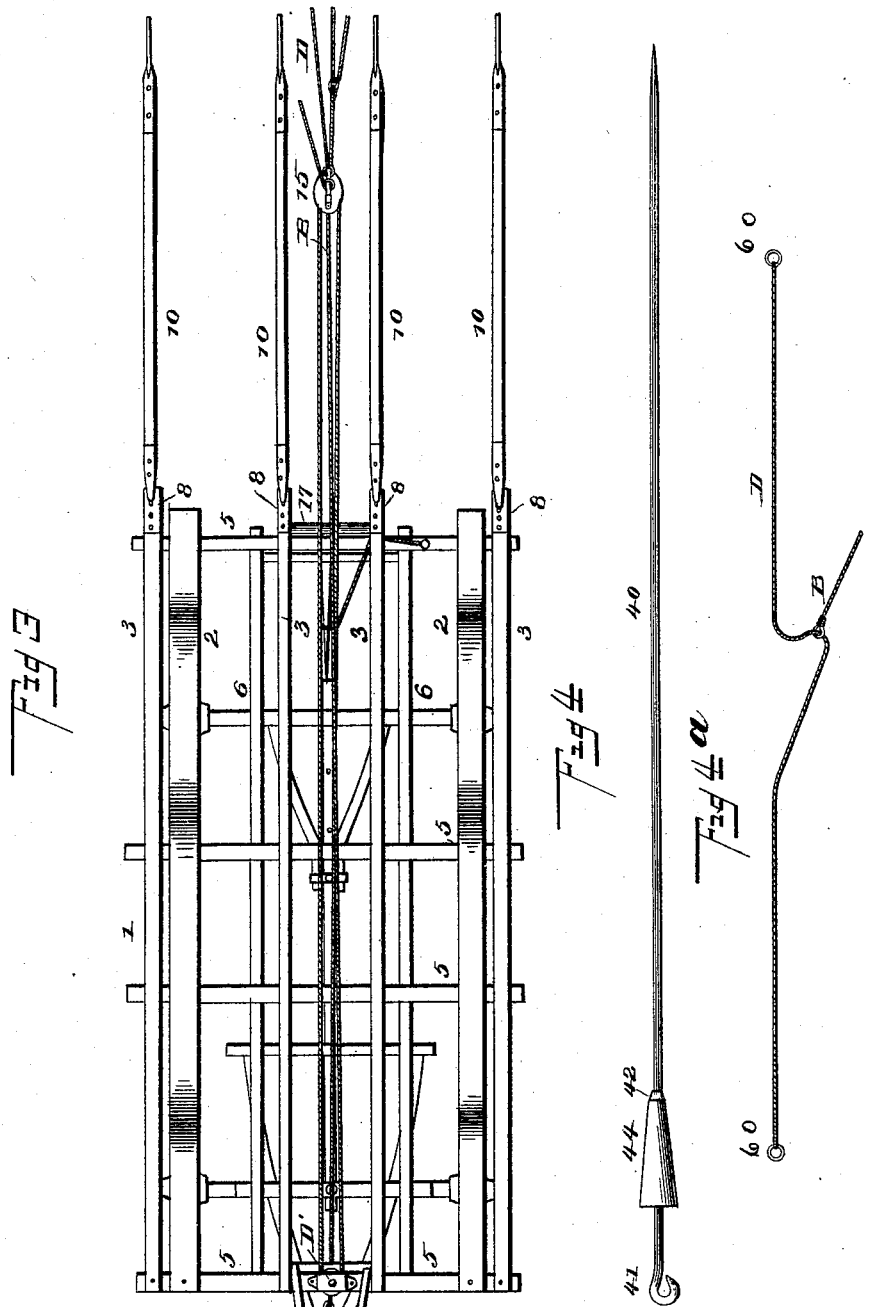

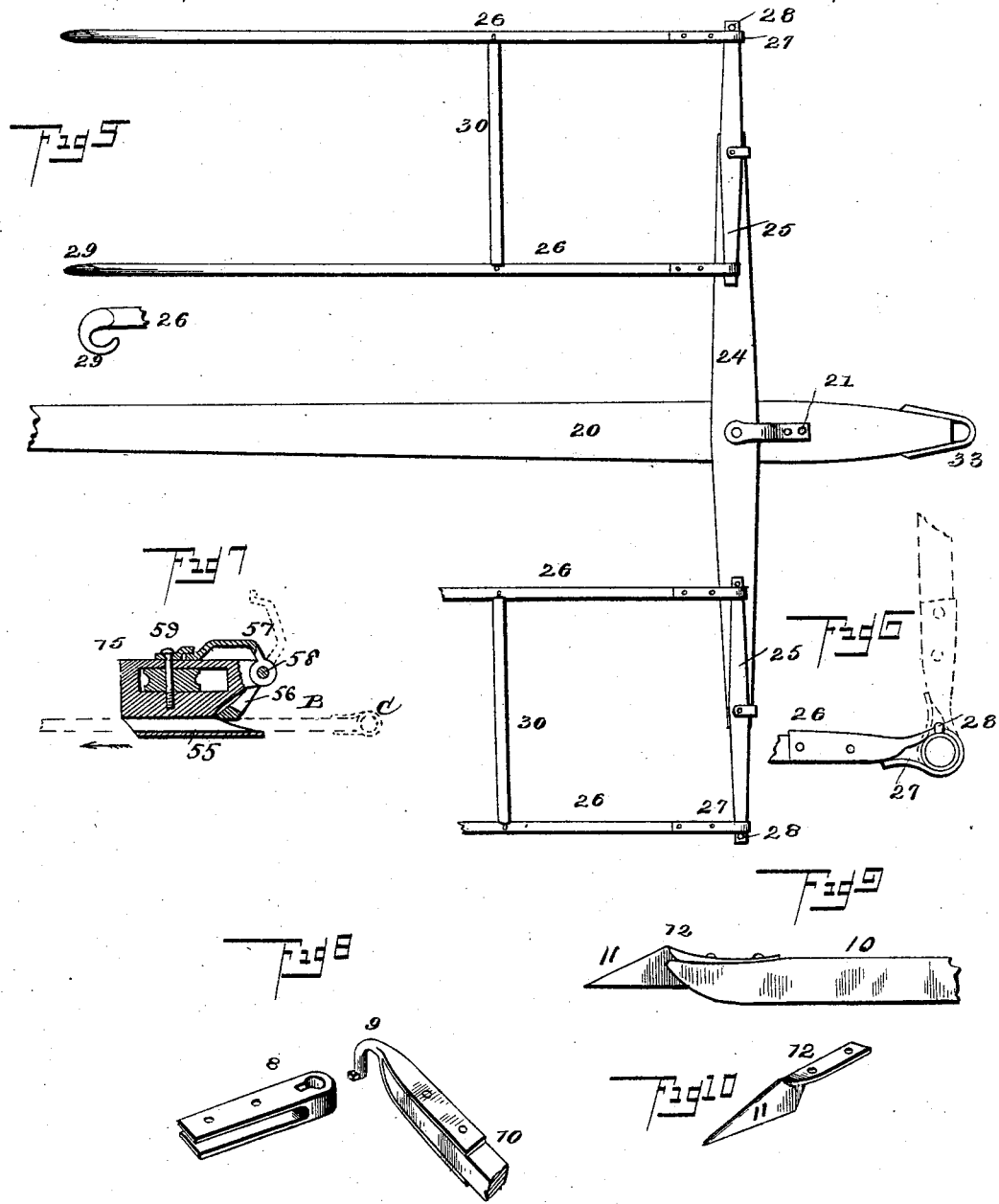

UNITED STATES PATENT OFFICE.

RICHARD GREGG, OF RANDOLPH, INDIANA.

HAY-CARRIER.

SPECIFICATION forming part of Letters Patent No. 595,385, dated December 14, 1897.

Application filed June 18, 1891. Serial No. 396,713. (No model.)

*To all whom it may concern:*

Be it known that I, RICHARD GREGG, of Randolph township, Ohio county, with post-office at Aurora, in the county of Dearborn and State of Indiana, have invented certain new and useful Improvements in Hay-Carriers, of which the following is a specification, reference being had therein to the accompanying drawings.

This invention relates to vehicles and attachments used in storing hay, grain in the shock, and the like.

The object of the invention is to produce a wagon or carrier having attachments by which haycocks or small stacks and similar products may be drawn onto the wagon by a team, thus saving the labor of pitching; also, to reduce the manual labor of haying and harvesting to a considerable extent and to improve the mechanism employed for the purpose.

Figure 1 is a side elevation or diagram of a hay-wagon and connected apparatus for loading a haycock by horse traction. Fig. 2 is an enlarged elevation of wagon, skids, and tackle for hauling up hay. Fig. 3 is a plan of wagon and connections. Fig. 4 is a view of hay-needle; Fig. 4ª, a view of a tie-cord. Fig. 5 is a broken plan of the extra tongue and shafts or tugs which are used to connect the horses to the wagon or to the haycock. Fig. 6 is an end elevation of whiffletree with tug. Fig. 7 is a longitudinal section of pulley connected to loading-tackle. Fig. 8 is a perspective showing coupling-joints of the skids. Fig. 9 is an elevation of end of one skid; Fig. 10, the blade applicable to lower end of skid.

A indicates the running-gear of a wagon, which may be of any usual construction for farm-wagons. I prefer to use a wagon with largest wheels in front; but this is a matter of convenience merely. On the running-gear I apply a hay-rack 1. This rack is a long and broad platform having preferably curved guard-pieces 2, which extend from end to end of the rack and rise above the tops of the wheels. The rack also has longitudinal bars 3, which extend lengthwise. There should be no obstructions to endwise movement of anything lengthwise of the wagon on the guard-pieces 2 and rack-bars 3. The cross bars or beams 5 5 rest on stringers 6 6, which are supported on the axles or hounds of the wagon, so that the guards 2 and bars 3 may be unobstructed in the direction of their length. The bars or tracks 3 3 have sockets 8 at their rear ends. These sockets are preferably keyhole-sockets to receive splined pintles 9, attached to skids 10 10. The skids 10 are of such length as to form an easy incline from the ends of bars 3 to the ground. As the skids are held to the bars simply by the socket-and-pintle connection, the lower ends of the skids will drag on the ground when the wagon is drawn along, or the skids may be detached by turning to the proper angle and lifting the pintles from the sockets. Ordinarily in the hay-field the skids will be allowed to drag after the wagon, as they are light and form little obstruction. The lower ends of the skids 10 are rounded upward, so as to slide along the ground when the wagon backs; but to insure an unobstructed incline from the ground to the surface of the hay-rack a blade 11 is preferably inserted in a slot at the lower end of the skid, as shown in Fig. 9. The blade will cut slightly into the ground, but will be prevented from entering deeply by the rounded lower end of the skid, and the upper surface of the blade will complete the incline made by the upper surface of the skid. The blade 11 may be attached to a plate 12, which rests on the skid.

I use the wagon and skids constructed on the general plan aforesaid for loading hay in large cocks or stacks of a half-ton or upward. The wagon is backed up near to the stack, with the lower ends of the skids in close proximity to the stack. Then the team is detached from the wagon and attached to a rope connected to the haystack and passing over the wagon lengthwise. The team is then started forward and the stack or cock of hay is drawn up the inclined skids and onto the wagon. Preferably two stacks or cocks of about a half-ton each will be so drawn up one after the other. The preferred tackle for attaching to and drawing up the stacks I will now explain.

I use a pulley 15 of peculiar construction, having a channel through which rope B passes. Rope B has a ring C at its end, through which the tie-cord D passes. The tie-cord is simply a piece of rope—say one-half inch diameter—with a ring or gromet 60 at each end. Rope B passes over the antifriction-roll 17, extending crosswise at the rear of the hay-rack and thence forward and around a sheave D', fixed to the front cross-bar of the rack. Thence rope B passes back over roll 17 and around the sheave in pulley-block 15, and again forward over the roll 17, and at the front of the wagon is attached to the doubletree of the wagon or otherwise connected to the team, so that by detaching the doubletree from the wagon and starting the team forward there will be no direct draw on the wagon, but a draw on the rope B, tending to pull pulley 15 forward.

As a convenient means of attaching the rope B to the team I use a separate light tongue 20, which rests on the wagon-tongue E. Tongue 20 preferably has a ring or staple 23 attached near its front end, which ring loosely surrounds the wagon-tongue when the two tongues are in proximity. The rear end of the false tongue 20 has a hole 21, through which the coupling-pin or wagon-hammer passes when it is desired to couple the false tongue to the main tongue and so attach the team to the wagon.

The doubletree 24 is attached to false tongue 21 in any usual manner. The singletrees 25 25 are held to the doubletree 24 in usual way. Instead of using leather tugs, as usual, I prefer to use rigid strips 26, (preferably light wooden bars with metallic end loop and hook.) Each rigid tug 26 has a keyhole-loop 27, which may pass over a stud 28 on the singletree when the bar or tug is turned up, and when the tug is turned down it is held from slipping off the end of the singletree by said stud. The front ends of tugs 26 have hooks 29, which hook into the rings of the hames.

The pairs of rigid tugs 26 are held up by a strap 30, passing over the horse's back, so that the single and double trees and rear end of the false tongue are held at a proper height to lie on top of the wagon-tongue. The front end of the false tongue may be attached to the horses' collars by chains 31 or in other suitable manner. The false tongue and attachments are thus in position for easy attachment to the wagon-tongue or to ride on the team. The rope B is attached to a strap 33 or other suitable fastening device on the tongue.

The tie-cord D is passed around the haycock in the following manner: A hay-needle 40 is passed under the haycock. This needle is a steel rod having a hook 41 at one end, the other end being reasonably sharp. Near the hook there is a conical sleeve 44 of light metal and surrounding and movable on the needle. The sleeve 44 is held from moving forward by a fixed shoulder 42 on the needle, and the sleeve will not pass over the hook 41, but is free to slide between the two. In use the needle is pushed along the ground under the haycock until the point protrudes. Then the rings of the cord D are attached to hook 41 and the sleeve 44 moved back, so that it practically covers the rings. The needle and its attached cord can then be readily drawn under the haycock by hand. The conical sleeve prevents catching in the hay. When the needle has been pulled through under the cock, the cord is unhooked therefrom. The middle of the cord is attached to rope B. The ends of the cord D are carried obliquely over and around the sides of the haycock at about one-third the height of the cock and are hooked to the detaching-hook of pulley 15. The cock is by this means held with great firmness, and when the team attached to tongue 20 is started the rope B will be drawn and the haycock slid up the skids and forward on the wagon. The first cock is preferably drawn to the front of the wagon, when the detaching-hook on pulley 15 is loosened and the cock is released on the wagon. Then by drawing back on cord D the pulley 15 and rope B will be drawn back ready for use in drawing a second haycock onto the rear part of the wagon in the same manner.

Of course the haycock may be drawn up the inclined skids by a single rope passing forward from the cock over the wagon; but this requires a strong rope and tends to pull the wagon forward, whereas the wagon will generally stand on level ground without anchorage when the rope and tackle hereinbefore described are used. To overcome any tendency of the wagon to run away from the load, however, I generally attach an anchor thereto. This anchor is preferably a bar 50, pivotally connected to some part of the wagon, preferably near the rear thereof. The front end of the bar 50 should be sharpened and the length of the bar such that its sharpened front end will drop down onto and enter the ground when the bar is not held up. By dropping the bar 50 the wagon is pretty effectually prevented from moving forward. The bar may be held up by cord 52, so as not to serve as an anchor. Said cord is tied at one end to the anchor-bar and may be secured at the other end to any convenient part of the rack.

The pulley 15 has channel 55 extending lengthwise through the block, and rope B lies in this channel. A pawl 56 is pivoted in the block, so as to bite on the rope and prevent its backward movement, but to permit a forward movement in the direction of the arrow, Fig. 7. The block also has a detaching-hook 57, which is pivoted to a pin 58 near the rear end of the block. The front end of the hook 57 may be held down by turn-button 59 at the side of the block. The rings 60 of the cord D are passed over this detaching-hook 57 when the device is to be used in drawing up a load and the hook locked against detachment by the turn-button. As soon as the load shall have been drawn to its resting-place on the hay-rack the button 59 is turned and the hook 57 is released, thus releasing the tie-cord and haycock. I have described this hook, pulley, tie-cord, and needle as the best implements which I know for the purpose, being such as I have used successfully. At the same time it is not essential that all the devices described shall be employed—as, for instance, the tie-cord might be tied to cord B instead of being secured to the swiveled hook. The number of skids may be increased or diminished. The skids might be attached to the rack-bars by different hinges from those described, &c.

The method of loading the hay by the draft of the team without moving the wagon and while the team remains on the ground is, I believe, new in this art. By this method I am able to put a ton or more of hay on the wagon by the aid of one or two men and a team in much less time than the wagon could be loaded by half a dozen men with forks, and the load is in better condition for handling or stacking by other appliances which I have devised for the purpose.

In unloading the wagon a convenient way is to throw a loop or cord around the haycocks separately, the loop being supplied with anchors at each end. By preference the loop around the rear haycock will be a little tighter than that at the front. Then by starting up the wagon the cocks will be held by the cords or loops and the wagon drawn easily from under them. The dotted line 71, Fig. 1, illustrates this manner of throwing a loop around the front haycock to unload the same.

It will be understood that my method and mechanism admit of numerous changes, while remaining the same in general features. Thus the same mechanism applicable to a wagon for lifting or loosening a haycock may be applied to a truck or sled. The ordinary tongue used on a wagon or sled may be detached and used instead of a false tongue. I have used numerous devices other than those herein described; but in this specification I have endeavored to describe the best mechanism known to me, and I wish it to be understood that I do not thereby abandon my rights to modifications and equivalents.

What I claim is—

1. The body of a hay-rack having its bearing-surface composed of longitudinal bars and trailing skids pivoted to said bars, each skid having a broad lower surface resting on the ground, and a blade projecting below said lower surface, acting as a guide in backing and as a guide to the hay, substantially as described.

2. A hay-vehicle having inclined skids at the rear and a drawing-tackle, and a separate pole to which the drawing-tackle is directly attached, said pole having a detachable connection to the permanent pole of the vehicle, in combination substantially as described.

3. The combination with a hay-carrying vehicle having inclined skids at the rear, and a drawing-tackle, of a detachable pole, drawing-trees connected to said pole, and rigid tugs or draw-bars connected to said trees and to the harness of the team, so as to hold the pole at about the same height whether attached to or detached from the vehicle, substantially as described.

4. The vehicle having inclined skids and a draft-tackle the false tongue attached to the draft-tackle, the trees attached to the tongue, and rigid tugs attached to the trees and extending to the harness, said tugs locking to the trees by a bayonet-coupling, substantially as described.

5. The hay-vehicle having a draft-tackle consisting essentially of a pulley, a rope passing through a channel in said pulley, thence around a sheave on the vehicle, and thence around the sheave on the channeled pulley, and a tie-cord attached to the pulley-rope and to a detaching-hook on the channeled pulley, all substantially as described.

6. The hay-needle having a hook at one end and a loosely-sliding cone surrounding the needle near said hook, the other end of the needle being sharpened, substantially as described.

7. A hay-carrying vehicle having a rack consisting essentially of longitudinal bars, with skids hinged at the rear of the bars and trailing therefrom, said vehicle having a drawing-tackle and a separate pole to which the drawing-tackle is attached, said drawing-tackle extending backward along the line of the bars and skids, the pole being detachable from the main pole of the vehicle, and having suitable trees and connections for attachment of the team to the pole, all substantially as described.

8. The hay-carrying vehicle having a body provided with a drawing-tackle, the tackle consisting essentially of a channeled pulley-block, a rope connected at one end to the draft mechanism of the team and passing thence around the pulley in the block, thence around a projection on the carrier-body, and thence through the channel of the block, and thence to tie-cords or like appliances embracing the hay cock or shock, said block having a pawl bearing on the rope, and a detaching-hook by which the tie-cord may be attached, all substantially as described.

In testimony whereof I affix my signature in presence of two witnesses.

RICHARD GREGG.

Witnesses:
W. A. BARTLETT,
S. BRASHEARS.